United States Patent [19]
Grobl

[11] Patent Number: 4,811,513
[45] Date of Patent: Mar. 14, 1989

[54] LIGHTED LURE HEADPIECE

[76] Inventor: George Grobl, 1578 Graff Avenue, San Leandro, Calif. 94577

[21] Appl. No.: 76,745

[22] Filed: Jul. 23, 1987

[51] Int. Cl.$^4$ .............................................. A01K 85/00
[52] U.S. Cl. ..................................... 43/17.6; 43/42.53
[58] Field of Search ...................... 43/17.5, 17.6, 42.53

[56] References Cited

U.S. PATENT DOCUMENTS

| | | | |
|---|---|---|---|
| 3,608,228 | 9/1971 | Borresen | 43/17.6 |
| 4,085,538 | 4/1978 | Jankowski | 43/17.6 |
| 4,175,348 | 11/1979 | Ray | 43/17.6 |
| 4,227,331 | 10/1980 | Ursrey | 43/17.6 |
| 4,250,651 | 2/1981 | Ramme | 43/17.6 |
| 4,520,588 | 6/1985 | Hindermyer | 43/17.6 |
| 4,697,374 | 10/1987 | Simms | 43/17.5 |

FOREIGN PATENT DOCUMENTS

| | | | |
|---|---|---|---|
| 587453 | 11/1959 | Canada | 43/17.6 |
| 451426 | 8/1936 | United Kingdom | 43/17.6 |
| 2535433 | 2/1977 | Fed. Rep. of Germany | 43/17.6 |

*Primary Examiner*—Kurt Rowan
*Attorney, Agent, or Firm*—Bruce & McCoy

[57] ABSTRACT

A lighted lure headpiece having a plastic body with an electrical connector embedded therein at the internal end of an open-ended cavity formed in said headpiece and electrically connected to a multiplicity of LEDs and exposed for contact with a cellular type battery which can be enclosed in the cavity and moved into and out of contact with the electrical connector.

2 Claims, 1 Drawing Sheet

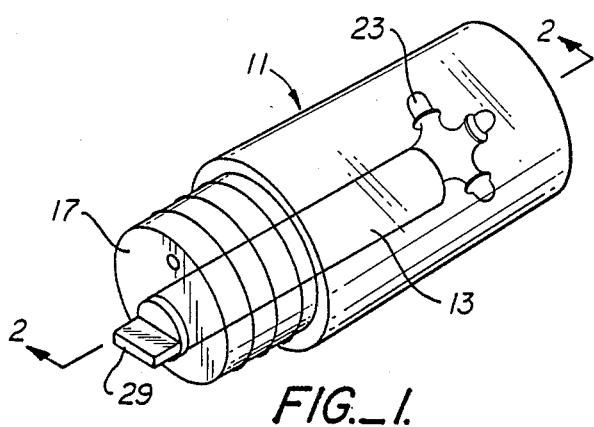
FIG._1.
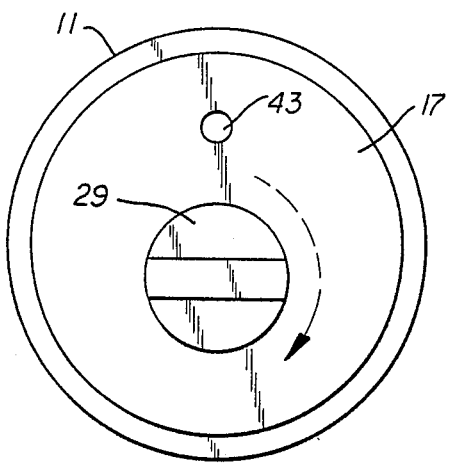
FIG._3.
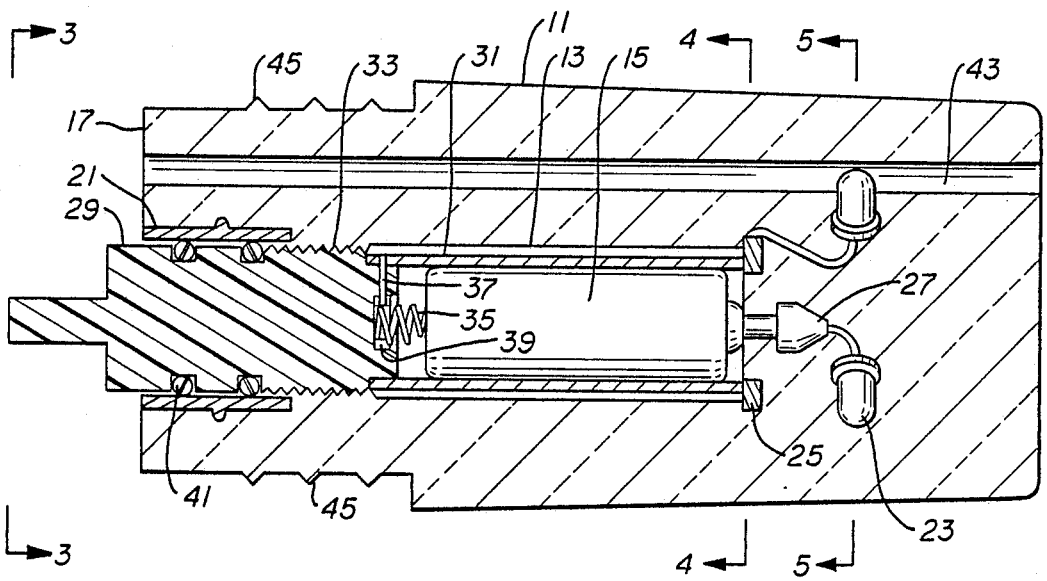
FIG._2.
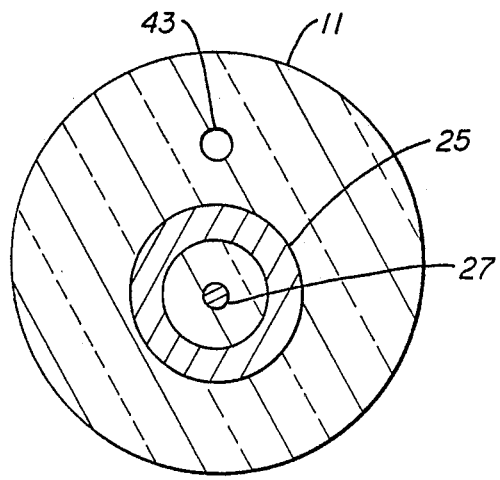
FIG._4.
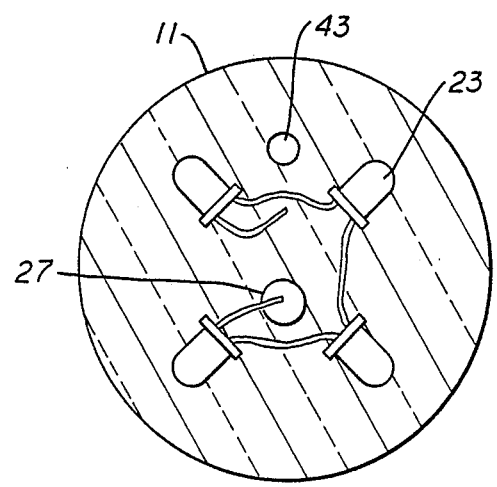
FIG._5.

LIGHTED LURE HEADPIECE

BACKGROUND OF THE INVENTION

1. Field of the Invention

The present invention relates to fishing lures and more particularly to self-contained light-emitting fishing lures for enhanced fish attracting qualities.

2. Description of the Prior Art

The present invention relates to light-emitting fishing lures as disclosed in my U.S. Pat. No. 4,663,880, issued May 12, 1987. Numerous prior art patents are mentioned and described in the Description of the Prior Art section of the Background of the Invention portion of that patent specification. In addition, numerous other light-emitting fishing lures have been cited by the examiner during the prosecution of that patent application. Other prior art was cited in my U.S. patent application Ser. No. 06/887,794, filed July 21, 1986, entitled A RECHARGABLE LIGHTED FISHING LURE. Concurrently I have a co-pending patent application Ser. No. 07/011,675, filed Feb. 6, 1987, under the title LIGHT-EMITTING FISHING LURE. All of the prior art cited in the above referenced applications is made of record in this specification by reference but is not distinguished. While they do show light-emitting lures, they do not anticipate the present invention alone or in combination.

The present invention is dissimilar to all of the above lighted lures because it is contemplated for use in very durable lures such as are used for tuna and marlin fishing. These commonly have head pieces as large as one to one-and-half inches in diameter and as much as three or more inches in length to which are attached feathers or rubber or plastic trailing strips which simulate squid tentacles. These lure headpieces must be tough to withstand the bite of fish mouths which can slice through soft metal. Therefore, a very tough construction is required which will withstand the destructive treatment that the lure is subjected to when being used for fishing for such fish as tuna. It must be durable and the electrical components that are encapsulated therein must be cushioned and protected against a destructive encounter with a fish. The present invention can be miniaturized while retaining its durable construction.

SUMMARY OF THE INVENTION

The present invention is a lighted lure headpiece which includes a plastic body having an open-ended cavity formed therein for containing a cellular-type battery. At least one light-emitting diode (LED) is embedded in the plastic body. An electrical connector is embedded in the plastic body at the internal end of the cavity. The connector includes a ring member and a post member with the post member being disposed concentric to the ring member and co-planer therewith. The two members of the connector are formed to electrically contact the opposite electrical contacts of the cellular-type battery while electrical circuitry is provided which connects the LED with the electrical connector. A plug is provided for closing the open end of the cavity in watertight sealed relation and has a tubular electrical connector extending therefrom formed to contain a cellular battery. The tubular connector is also formed to contact the ring member of the electrical connector. A spring means is disposed in the tubular connector urging the battery toward the post member of the electrical connector. Electrical circuity is provided for contacting the other electrical contact of the battery and connecting it with the tubular electrical connector.

The invention also includes the method of constructing a lighted lure headpiece. It comprises electrically connecting at least one LED to an electrical connector which includes a ring member and a post member. The post member is disposed concentric to the ring member and co-planer therewith. The LEDs are mounted along with the electrical connector on a stud post and they are suspended in a mold spaced from the sides thereof. The mold is filled with a thermo setting casting resin and after the plastic is hardened into a plastic lure body, the stud is withdrawn from the mold leaving the electrical connector and the LED and its electrical circuit embedded in the plastic with the electrical connector exposed for contact with a cellular type battery and its circuit.

OBJECTS OF THE INVENTION

It is therefore an important object of the present invention to provide a light-emitting lure headpiece for large size lures.

It is another object of the present invention to provide an illuminated lure headpiece which encapsulates all of the electrical circuitry and components in a very tough structure which protects the delicate parts from a destructive encounter.

And it is a further object of the present invention to provide a light-emitting lure headpiece which can be activated without assembly or dissassembly of the lure while it is held in the fisherman's hands.

Other objects of the invention will become apparent when it is considered in conjunction with the accompanying drawings.

DESCRIPTION OF THE DRAWINGS

FIG. 1 is a perspective view of the lighted lure headpiece of the present invention;

FIG. 2 is a cross-section of the present invention taken along lines 2—2 of FIG. 1;

FIG. 3 is a rear end elevation thereof;

FIG. 4 is a cross-section taken along lines 4—4 of FIG. 2; and

FIG. 5 is a cross-section of the lighted lure headpiece present invention taken along lines 5—5 of FIG. 2.

DESCRIPTION OF THE PREFERRED EMBODIMENT

FIGS. 1 and 2 disclose the light-emitting lure headpiece of the present invention. It includes a transparent or translucent plastic body portion 11 having an open-end cavity 13 formed therein for containing a cellular-type battery 15. The body is generally cylindrical in shape and most easily made by being cast in a thermo setting casting resin.

In the preferred embodiment, the cavity 13 extends from the rear of the headpiece 17 forward into the body portion and is generally cylindrical in internal configuration. At the forward end of the cavity, an electrical connector is disposed for contact with a battery and its actuating circuitry. The rear end of the cavity in the preferred embodiment is provided with a metal liner 21 for creating a smooth surface for sealing rings.

At least one light-emitting diode (LED) 23 is embedded in the plastic body 11 between the forward end of the cavity 13 and the front end of the lure headpiece. In the preferred embodiment a multiplicity of LEDs are spaced around and embedded in the internal volume of the forward end of the lure headpiece. These LEDs are wired in series and include internal circuitry which effects intermittent operation. This is a solid state circuit which interrupts the electrical flow to make the LEDs flash in their light emission. The series wiring of the LED electrical circuitry is electrically connected to the electrical connector embedded in the headpiece at the forward end of the cavity.

The electrical connector includes a ring member 25 and a post member 27. The post member is disposed concentric to the ring member and co-planer therewith and is formed to electrically contact one electrical contact of the cellular-type battery. The ring member is disposed perpendicular to the longitundinal axis of the cavity and concentric therewith.

A plug 29 is provided for closing the open end of the cavity in watertight sealed relation. It has a tubular electrical connector 31 extending therefrom formed to contain a cellular battery 15 and to contact the ring member 25 of the embedded electrical connector at the forward end of the cavity. The plug is threaded for engaging internal threads 33 formed in the cavity 13 forward of the metal liner 21. Threaded engagement permits the plug to be moved forward and backward in the cavity. When the plug is moved to its forward position, the tubular electrical connector contacts the ring member of the electrical connector embedded in the plastic body at the forward end of the cavity. This establishes an electrical contact. When the plug is withdrawn a small distance by unscrewing it, the tubular member is withdrawn also and the electrical contact with the ring member of the electrical connector is broken. Thus, the on-off operation of the LEDs is affected by either tightening the plug in the cavity or withdrawing it.

A spring means 35 is disposed in the tubular electrical connector 31 urging the battery 15 toward the post member 27 of the embedded electrical connector so that when the electrical contact is established by the tubular member, the battery is also urged forward into contact with the post member of the electrical connector concurrently.

Electrical circuitry is provided for engaging the opposite electrical contact of the battery from the one which contacts the post member, and electrically connecting the battery with the tubular electrical connector 31. In the simplest version, it is simply a wire 37 which contacts a metal cup 39 disposed in the front end of the plug. The cup contains the spring 35 which projects from the front end of the plug 29. The wire connects the cup with the tubular connector which is also secured to the front end of the plug around its periphery. Contact of the spring with the cup establishes electrical contact with the tubular connector.

The plug 29 is also provided with ring seals 41 around its rear end which create a watertight seal between the plug and the plastic body 11.

The plastic body 11 of the lure headpiece in typical configuration includes a metal tubing lined hole 43 through the length of the body or parallel to the axis of the lure headpiece and the internal cavity through which the leader is run to a hook or hooks which are disposed at the rear end of the body. The tubing may be contour bent to conform to different lure shapes. The plastic body also includes a series of ridges 45 around its rear portion to which are secured tail feathers or streamers which surround and hide the hook and also simulate the action of a baitfish or squid. The headpiece can also be weighted for deep trolling or jigging.

The present invention also contemplates the new and novel method of manufacturing a fishing lure. That method includes the steps of electrically connecting at least one LED to an electrical connector which includes a ring member and a post member with the post member being disposed concentric to the ring member and co-planer therewith. Mounting the LED and the electrical connector on a stud post and suspending the stud post in a mold space from the sides thereof. The mold is then filled with a thermo setting casting resin (for cold molding) or with a thermal plastic or solvent plastic material, but these plastics in liquid form are much less handy to use than casting resins. After the plastic has hardened into a plastic lure body, the stud is withdrawn, leaving the electrical connector and the LEDs with its electrical circuit embedded in the plastic with the electrical connector exposed for contact with a cellular battery and its circuit.

Thus it will be seen from the description of the preferred embodiment of the present invention that all the objects and advantages attributable thereto have been obtained. While the invention has been described in considerable detail, the invention is not to be limited to such details as have been set forth except as may be necessitated by the appended claims.

I claim:

1. A flashing lure headpiece comprising
   a generally solid cylindrical plastic body having a cylindrical open-ended cavity formed in the rear end thereof for closely surrounding and container a cellular battery, a portion of the length of said cavity including an internally threaded portion,
   at least one LED embedded in the front end of said plastic body including internal circuitry to effect intermittent operation thereof,
   an electrical connector embedded in said plastic body at the internal end of said cavity, said connector including a ring member and a post member, said post member being disposed concentric to said ring member and co-planar therewith and formed to electrically contact one electrical contact of a cellular battery,
   an electrical circuitry connecting said LED with said electrical connector,
   a threaded plug formed for closing the open end of said cavity in watertight sealed relation and threadably engaged with the threaded portion of said cavity, said plug including ring seals disposed on the rear end of said plug between the threaded portion of said plug and the rear end of said plastic body and sealing said plug in said cavity at least when said plug is disposed in said cavity at its forwardmost position,
   a tubular electrical connection extending from the front end of said plug and formed to contain a cellular battery and to contact said ring member of said electrical connector,
   spring means disposed in said tubular electrical connector urging said battery toward the post member of said electrical connector, and
   electrical circuitry for contacting the other electrical contact of said battery and electrically connecting it with said tubular electrical connector.

2. The method of forming a lighted lure headpiece comprising electrically connecting at least one LED to an electrical connector including a ring member and a post member, said post member being disposed concentric to said ring member and co-planer therewith, mounting said LED and said electrical connector on a stud post, suspending said stud post, said connector, and said LED in a mold spaced from the sides and end thereof, filling said mold with a thermo setting casting resin, and after said casting resin has hardened into a plastic lure body, withdrawing said stud leaving said electrical connector and said LED and its electrical circuit embedded in said plastic with the electrical connector exposed for contact with the cellular battery and its circuit.

* * * * *